Oct. 1, 1940.  D. HOLZKÄMPER  2,216,667
BUNG BUSH
Filed Aug. 11, 1937
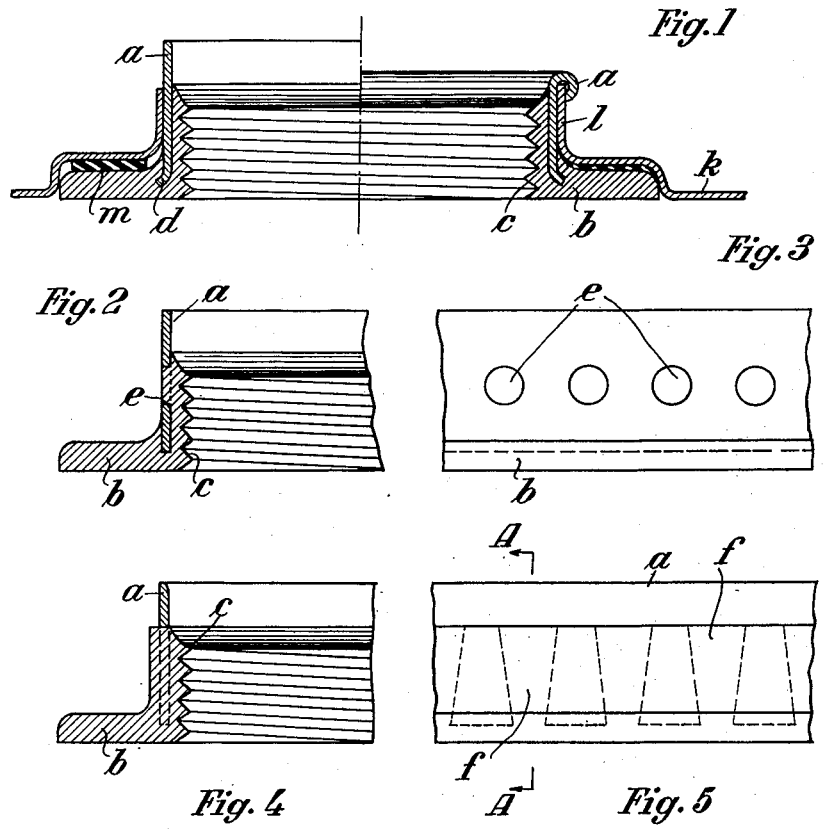

Patented Oct. 1, 1940

2,216,667

UNITED STATES PATENT OFFICE 2,216,667

BUNG BUSH

David Holzkämper, Cologne-Ehrenfeld, Germany, assignor, by mesne assignments, to N. V. Serlox, The Hague, Netherlands Application August 11, 1937, Serial No. 158,577
In Germany May 4, 1936

3 Claims. (Cl. 285—49)

The invention relates particularly to bung bushes of the kind which, on being fixed to the wall of sheet-metal containers and the like, are subjected to a subsequent deformation.

Hitherto such bung bushes have had to be made from a relatively expensive, high-quality material which will stand deformation when in the cold state, for instance from malleable steel. Not only is the material very costly, but the cost of manufacture is considerably greater than is the case with bushes which can be made of material that can be cast.

On the other hand bung bushes made for instance by die-casting or the like have a great advantage which is due to the lower manufacturing costs. The die-cast bushes are produced in the press die in the completely finished form including the thread and require no subsequent operations. As however die-casting cannot be employed for bung bushes which have to be subsequently deformed when being fixed, as it is unsuitable for being deformed in the cold state, such bungs could only be used in cases in which the bush has not to be deformed in any way when being fixed to the metal wall of the containers.

The invention overcomes the existing disadvantages by providing a bung bush composed partly of material which can be deformed when cold and partly of material which cannot be deformed. For instance, only the part of the bush to be deformed is made of soft metal, whilst the remaining part of the bung bush consists of die-cast material. This has the advantage that the bung bush can be made mainly of die-cast or otherwise cast material without there being any waste of material and without the necessity of subsequent tooling. As the deformable part a simple metal ring cast in the bush is mostly used, which is preferably provided with perforations, for the purpose of giving the molten material the possibility of adhering more firmly to the applied part and of increasing the stability of the bush.

Through the avoidance of all waste and through the simplified mode of manufacture of the bung bush the manufacturing costs are greatly reduced as compared with the stamped and pressed bung bushes. In view of the considerable mass production of bung bushes the saving described is particularly important.

In the accompanying drawing Fig. 1 represents in cross-section a bung bush inserted in the bush bearing of a container wall, the bush being shown on the left-hand side before being fixed to the container wall and on the right-hand side after being fixed.

Fig. 2 is a sectional view of a modification of the invention.

Fig. 3 is a side elevation of the form of bush illustrated in Fig. 2.

Fig. 4 is a partial section of a further modified form of the invention.

Fig. 5 is a fragmentary elevation of the form of invention shown in Fig. 4.

Referring to the drawing in detail, the bung bush consists of the deformable ring $a$ which is cast in the bush body $b$ made for instance of die-cast material. The ring $a$ may be made in a simple way for instance of band iron. It is inserted in the die-casting mould and the remaining space in the die is filled with die-casting material. The threaded part $c$ is also formed in the die-casting mould, so that the bush is directly ready for use after being removed from the die. For obtaining better cohesion between the ring $a$ and the die-cast body $b$ the former may with advantage have a portion $d$ of the inserted part expanded. The flange $b'$ of the bush body $b$ is made polygonal in a known manner for preventing the bung bush from turning, in the seat formed in the wall $k$ of the container after the edge of the ring $a$ is turned over the container flange $l$. During the application of the bung bush to the container, the packing $m$ is pressed tightly between the body $b$ and the container wall.

In the modification of the invention shown in Figs. 2 and 3, the ring $a$ is provided with perforations $e$, which are filled by the die-cast material and ensure a further better cohesion of the two different materials. The arrangement of the perforations $e$ is more clearly seen from Fig. 3.

In the form of invention shown in Figs 4 and 5 trapezium-shaped pieces $f$ are cut out of the ring $a$, which are filled by the die-cast material. In this way continuity of the die-cast material on either side of the ring $a$ is obtained.

What I claim is:

1. A two-part bung bushing adapted to be fixed in an opening of a container wall comprising, a ring member of relatively thin deformable material, and a body member of substantially non-deformable material united to an end portion of the ring member by casting to form a unitary bung bushing, the free end of said ring member being adapted to be deformed into engagement with the surface of the container wall.

2. A two-part bung bushing adapted to be fixed in an opening of a container wall comprising, a ring member of relatively thin deformable material provided with a plurality of openings, and a body member of substantially non-deformable material united to an end portion of the ring member by casting to form a unitary bung bushing, part of the material of said body member extending through said openings to form anchoring means for said ring member, the free end of said ring member being adapted to be deformed into engagement with the surface of the container wall.

3. An outlet adapted to be fixed in an opening of a container wall comprising, a ring member of relatively thin deformable material, and a body member of substantially nondeformable material united to an end portion of the ring member by casting to form a unitary structure, the free end of said ring member being adapted to be deformed into engagement with the surface of the container wall.

DAVID HOLZKÄMPER.